(12) United States Patent
Izumi (10) Patent No.: US 9,654,663 B2
(45) Date of Patent: May 16, 2017

(54) MOBILE TERMINAL DEVICE OF CONTROLLING IMAGE FORMING APPARATUS, AND METHOD

(71) Applicant: KYOCERA Document Solutions Inc., Osaka (JP)

(72) Inventor: Tomoyuki Izumi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/152,415

(22) Filed: May 11, 2016

(65) Prior Publication Data
US 2016/0337550 A1 Nov. 17, 2016

(30) Foreign Application Priority Data
May 11, 2015 (JP) .................. 2015-096427

(51) Int. Cl.
*H04N 1/32* (2006.01)
*H04N 1/00* (2006.01)

(52) U.S. Cl.
CPC ..... *H04N 1/32374* (2013.01); *H04N 1/00307* (2013.01); *H04N 2201/0094* (2013.01)

(58) Field of Classification Search
CPC .......... H04N 1/32374; H04N 1/00307; H04N 2201/0094
USPC ...................................... 358/1.15
See application file for complete search history.

(56) References Cited

U.S. PATENT DOCUMENTS

| 6,580,460 | B1* | 6/2003 | Takahashi | .......... | H04N 1/00885 348/372 |
| 7,660,009 | B2* | 2/2010 | Maruyama | ............... | H04N 1/00 358/1.15 |
| 9,329,549 | B2* | 5/2016 | Yamada | ............... | G03G 15/502 |
| 2014/0111826 | A1* | 4/2014 | Nakamura | ........... | G06K 15/409 358/1.14 |
| 2014/0285845 | A1* | 9/2014 | Ishikawa | ............ | H04N 1/00204 358/1.15 |
| 2015/0244878 | A1* | 8/2015 | MacAuley | ............ | G06F 3/1204 358/1.2 |

FOREIGN PATENT DOCUMENTS

JP 2011-059750 A 3/2011

* cited by examiner

*Primary Examiner* — Allen H Nguyen
(74) *Attorney, Agent, or Firm* — Hawaii Patent Services; Nathaniel K. Fedde; Kenton N. Fedde (57) ABSTRACT

Provided is a mobile terminal device that can prevent print data from being erased due to a battery exhaustion. This mobile terminal device have a battery as a power source, constructs print data (PD) from print target data stored in a volatile storage part to transmit to an image forming apparatus (IFA), and causes the IFA to execute printing of the PD. The mobile terminal device includes a non-volatile storage part, a battery residual amount detection part configured to detect a residual amount of the battery, and a print allowance/disallowance determination part configured to store, pursuant to a determination thereof, the PD in the non-volatile storage prior to a transmission of the print data based on the residual amount of the battery detected by the battery residual amount detection part, that no power required for transmitting the PD is ensured.

5 Claims, 12 Drawing Sheets

MOBILE TERMINAL DEVICE OF CONTROLLING IMAGE FORMING APPARATUS, AND METHOD

INCORPORATION BY REFERENCE

This application is based on and claims the benefit of priority from Japanese Patent Application No. 2015-096427 filed on May 11, 2015, the contents of which are hereby incorporated by reference.

BACKGROUND

The present disclosure relates to a mobile terminal device that is capable of controlling an image forming apparatus and a method of controlling the same.

Recently, a technique is known in which print data is constructed from print target data such as document data in a battery operated mobile terminal device such as a smart phone or a note type personal computer and the constructed print data is transmitted, thorough a wired or wireless network system, to an image forming apparatus such as a printer, a copier, and an MFP (Multifunction Peripheral/Printer Product) for printing the print data. As to this printing procedure, the mobile terminal is battery operated, which requires for defending against a battery exhaustion. Thus, a technique has been proposed which changes, depending on the remaining amount of a battery, a method of selecting image data to be printed out at an image forming apparatus in order to transmit the image data stored in the mobile terminal device before the battery exhaustion occurs.

SUMMARY

The present disclosure provides a mobile terminal device that is configured to have a battery as a power source, construct print data from print target data that is stored in a volatile storage part, and transmit to an image forming apparatus, and cause the image forming apparatus to execute printing of the print data, the mobile terminal device being featured to include: a non-volatile storage part; a battery residual amount detection part that is configured to detect a residual amount of the battery; a print allowance/disallowance determination part that is configured to store, pursuant to a determination thereof, the print data in the non-volatile storage prior to a transmission of the print data, based on the residual amount of the battery which is detected by the battery residual amount detection part, when no power required for the transmission of the print data is ensured.

The present disclosure also provides a method of executing print data transmission operation, the method including the steps of: causing a mobile terminal device that has a battery, a volatile storage part and a non-volatile storage part to construct print data from print target data that is stored in the volatile storage part; causing the mobile terminal device to transmit the print data to an image forming apparatus; and causing the mobile terminal device to allow the image forming apparatus to print out the print data, the method further including the steps of: causing the mobile terminal device to act as an allowance/disallowance determination part; confirming that no power required for a transmission of the print data is ensured based on a residual amount of a battery which is detected by a battery residual amount detection part; and causing the non-volatile storage part to store the print data prior to a transmission of the print data.

DETAILED DESCRIPTION

Hereinbelow, with reference to the attached drawings, a description is made in detail as to an exemplary embodiment of the present disclosure. It is to be noted that the elements of same functions are referred to by the same reference codes in the following exemplary embodiment.

Figure 1:
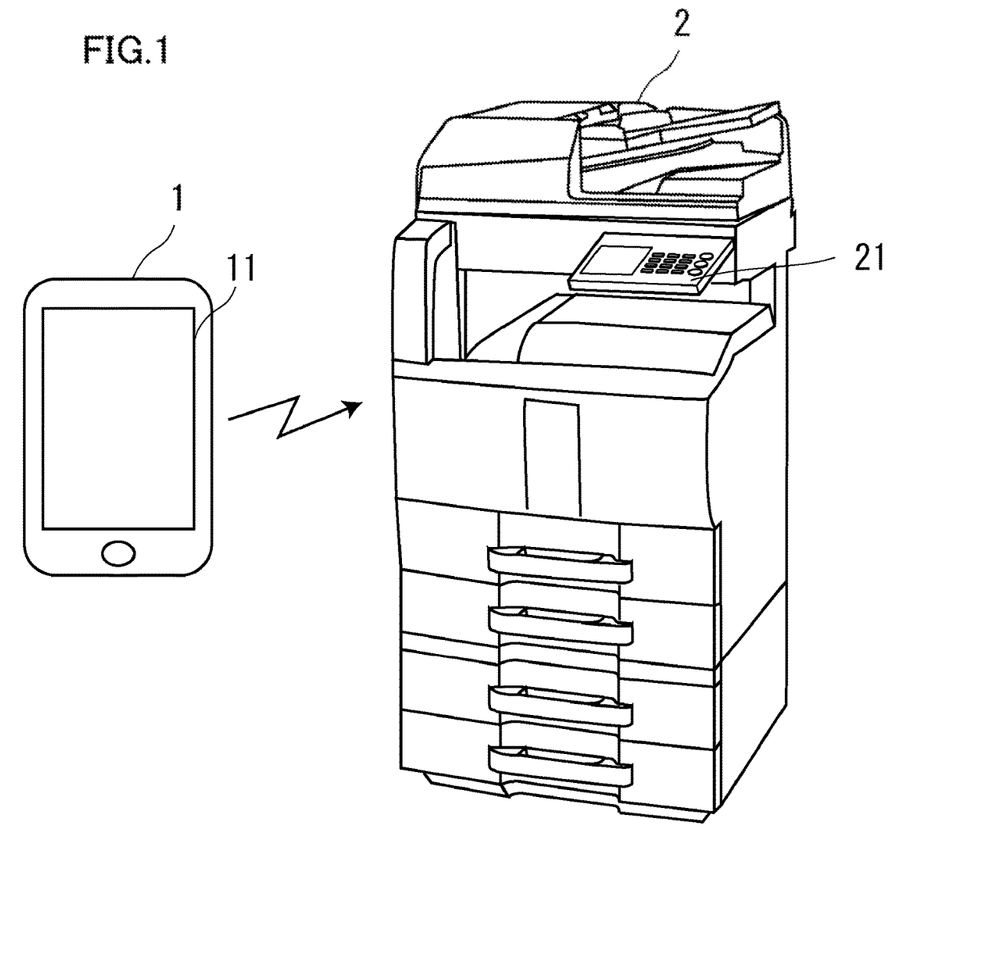
FIG. 1 is a system configuration diagram of a print system according to an exemplary embodiment of the present disclosure which includes a mobile terminal device and an image forming apparatus.

As illustrated in FIG. 1, an image forming system includes a mobile terminal device 1 and an image forming apparatus 2 that is connected to the mobile terminal device 1 via a wireless network system. The image forming apparatus 2 is in the form of, for example, a printer, a copier, or an MFP (Multifunction Peripheral/Printer Product) that has both communication and printing functions, and is configured to be operable from the mobile terminal device 1 or an operation panel 21.

Figure 2:
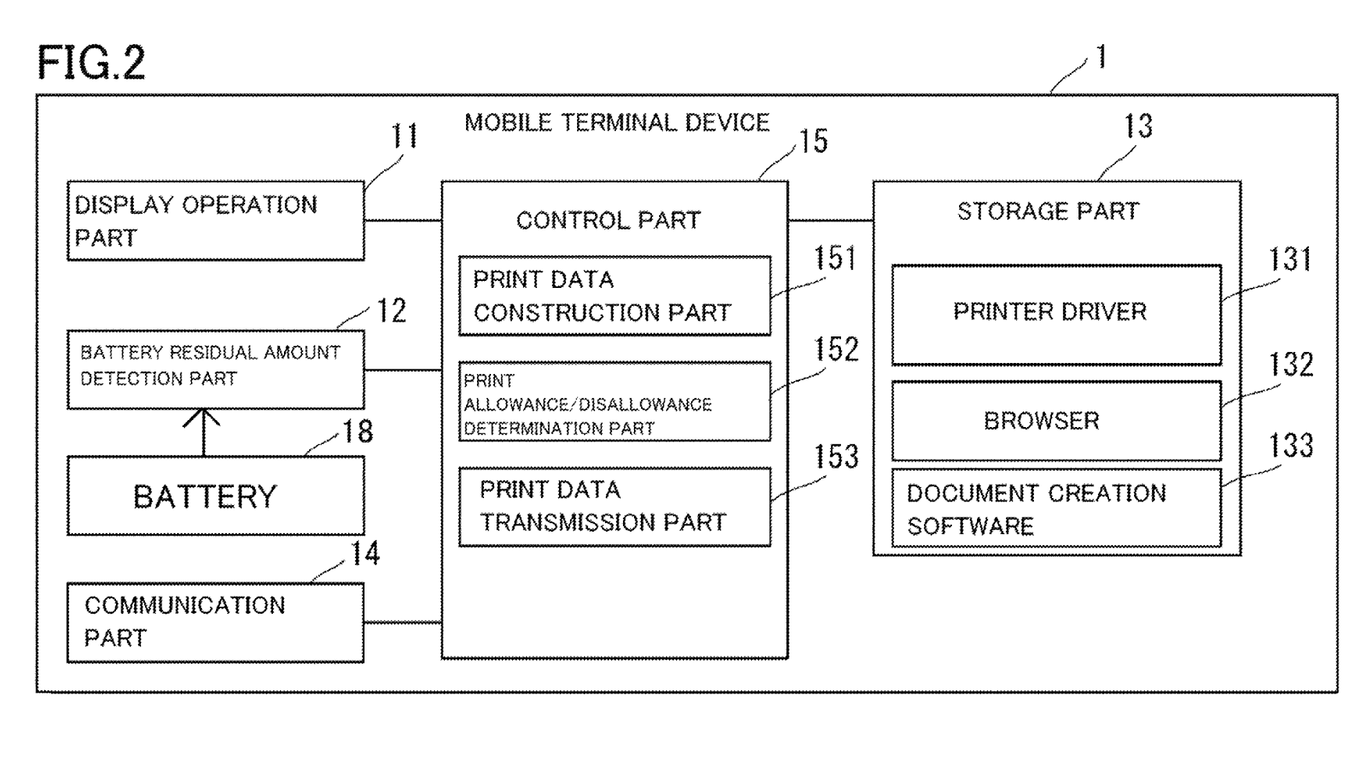
FIG. 2 is a blockdiagram showing a configuration of the mobile terminal device shown in FIG. 1.

The mobile terminal device 1 is a portable device with a battery 18 as a power source which is in the form of, for example, a cellular phone, a smart phone, a tablet terminal, or a PDA (Personal Digital Assistant). As shown in FIG. 2, the mobile terminal device 1 includes a display operation part 11, a battery remaining amount detecting part 12, a storage part 13, a communication part 14, and a control part 15.

The display operation part 11 is a user interface that includes a display part for displaying various information and various operation keys. The display part may be in the form of a touch panel in which a transparent pressure sensitive sensor is so provided on an outer surface of a display panel as to act a display means and input means.

The battery residual amount detecting part 12 is configured to detect a residual amount of a battery 18 and inform the detected battery residual amount to the control part 5. It is to be noted that detecting the battery residual amount may be performed based on measuring a voltage between terminals of the battery and its inner resistance or measuring the currents entering and leaving the battery. In addition, the battery residual amount may be detected in arbitrary units such that a fully charged battery indicates 100 percents or electrical energy [Wh]. The battery residual amount detecting part 12 is configured to detect the battery residual amount in units of percents.

The storage part 13 is a non-volatile storage part such as a semiconductor memory or a HDD (Hard Disk Drive). In the storage part 13, there is stored a printer driver 131. The printer driver 131, which is an application program for transmitting print data to the image forming apparatus 2, is installed in the mobile terminal device 1. A user can install the printer driver 131 in the mobile terminal device 1 by downloading the printer driver 131 from the Internet via the communication part 14. The storage part 13 also stores therein a browser 132 and a document creation software 133 which are for viewing and editing document data of, for example, HTML format or Microsoft's Word format.

The communication part 14 has functions of transmitting and receiving various data, to and from the image forming apparatus 2. The communication part 14 also has functions of transmitting and receiving various data, to and from an information processing device such as a server that is connected to the Internet.

The control part 15, which is connected to the display operation part 11, the battery residual amount detecting part 12, the storage part 13, and the communication part 14, pursuant to specific direction information inputted through the display operation part 11, is configured to execute an overall operation control of the mobile terminal device 1. The control part 15 is an information processing part of, for example, a micro-computer that is provided with a ROM (Read Only Memory), a RAM (Random Access Memory), and so on. In the ROM, there is stored control program for the operation control of the mobile terminal device 1. The control part 15 is configured to control the overall operation of the mobile terminal device 1 pursuant to specific direction information inputted through the display operation part 11 by reading out the control program stored in the ROM and loading the control program on the RAM.

In addition, when an operation is conducted for starting the browser 132 and the document creation software 133 through the display operation part 11, the control part 15 reads out the browser 132 and the document creation software 133 which are stored in the storage part 13 and develop the browser 132 and document creation software 133 on the RAM for starting the browser 132 and the document creation software 133. Thereby, the user is capable of causing the display operation part 11 to display, for example, image data, HTML data, and document data for viewing and/or editing the same, by using the browser 132 and the document creation software 133.

The document data that is under viewing condition and/or editing condition by using the browser 132 and the document creation software 133 is stored in the RAM that is a volatile storage part. When the user issues an order to print out the document data that is under viewing condition and/or editing condition by using browser 132 and document creation software 133, the control part 15 reads out the printer drive 131 stored in the storage part 13 and develops the printer drive 131 on the RAM for starting the printer driver 131. Thereby, the control part 15 acts, for realizing functions of the printer driver 131, as print data construction part 151, a print allowance/disallowance determination part 152, and a print data transmission part 153.

Next, with reference to FIG. 3, FIG. 4A, FIG. 4B, FIG. 4C, and FIG. 4D, a print data transmission operation is described in detail.

Figure 3:
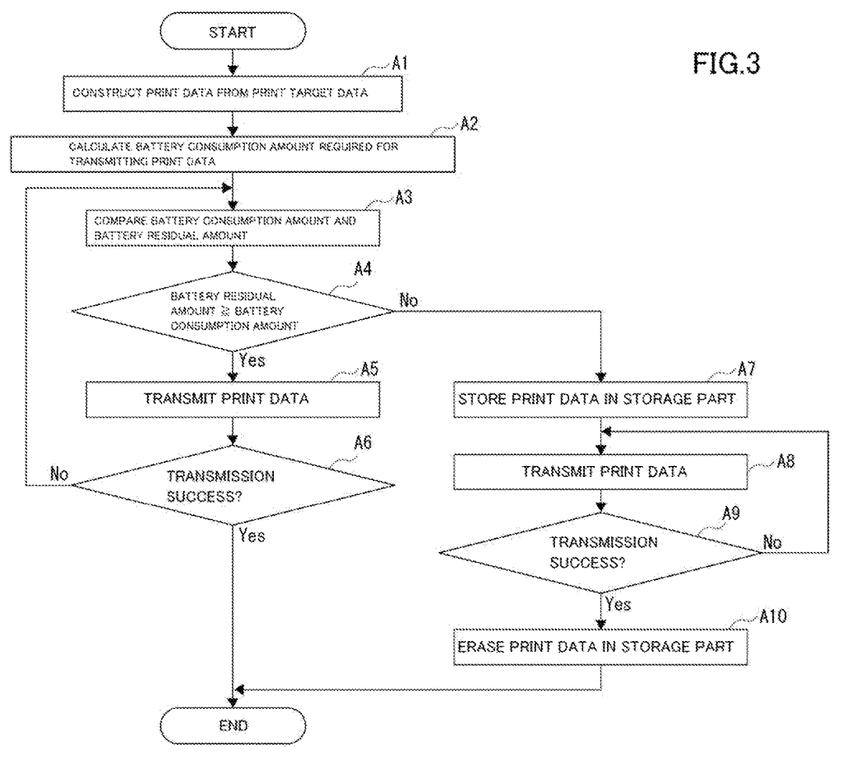
FIG. 3 is a flowchart showing a print data transmission operation of the mobile terminal device shown in FIG. 1.
Figure 4A:
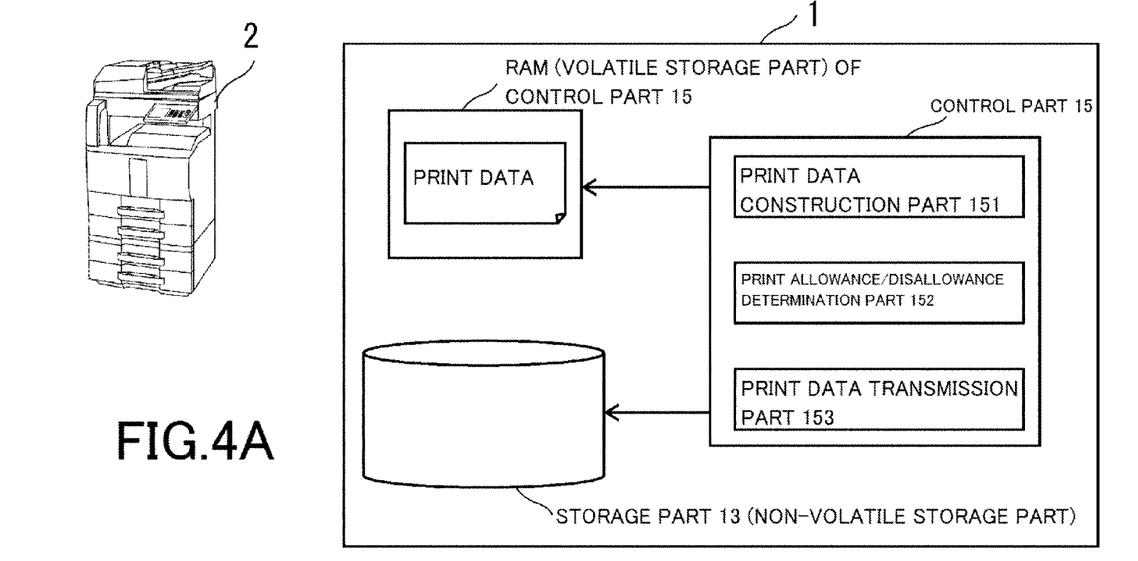
FIG. 4A is an explanation view explaining a stage of the print data transmission operation of the mobile terminal device shown in FIG. 1.

When an instruction is issued to print out the print target data, the control part 15 begins to act as the print data construction part 151 and then construct the print data from the print target data on the RAM of the control part 15 (Step A1). Thereby, as shown in FIG. 4A, a condition is established under which the print data is stored in the RAM of the control part 15.

Then, the control part 15 begins to act as the print allowance/disallowance determination part 152 and calculates a battery consumption amount that is required for transmitting the print data (Step A2). The larger the print data is, the longer the communication time, increasing the battery consumption amount. In the allowance/disallowance determination part 152, there is defined a battery consumption amount: Y % per unit print data: X bytes and the print data construction part 151 calculates the battery consumption amount by multiplying a data amount of the print data by (Y/X). Here, such a calculation is desired to be sufficient in light of an error in detecting the battery residual amount which is made by the battery residual amount detection part 12 and a possible increase of communication time caused by an external factors including a communication status. Alternatively, the battery consumption amount may be defined as a specified fixed value.

Then, the print allowance/disallowance determination part 152 makes a comparison between the battery residual amount that is calculated by the battery residual amount detection part 12 and the battery consumption amount that is calculated in Step A2(Step A3) and determines whether or not the battery residual amount is greater than or equal to the battery consumption amount (Step A4). Step 4, which is for determining whether or not the battery residual amount is greater than or equal to the battery consumption amount that depends on the data amount of the print data, determines whether or not the transmission of the print data can be terminated in success without a battery exhaustion.

If the result of step A4 indicates that the battery residual amount is greater than or equal to the battery consumption amount, the control part 15 begins to act as the print data transmission part 153, causes the communication part 14 to transmit the print data to the image forming apparatus 2 (Step A5), and determines whether or not the transmission terminates in success (Step A6). If the result of Step A6 indicates a successful termination of the transmission, the control part 15 terminates the print data transmission operation.

If the result of Step A6 indicates a failure in the transmission, the program returns to Step A3 for causing again the print allowance/disallowance determination part 152 to make a comparison between the battery residual amount and the battery consumption amount. More specifically, due to the fact that the transmission of the print data in Step A5 decreases the battery residual amount, before a re-transmission of the print data, a re-comparison is made between the current battery residual amount and the battery consumption amount in order to determine whether or not the battery residual amount is greater than or equal to the battery consumption amount.

Figure 4B:
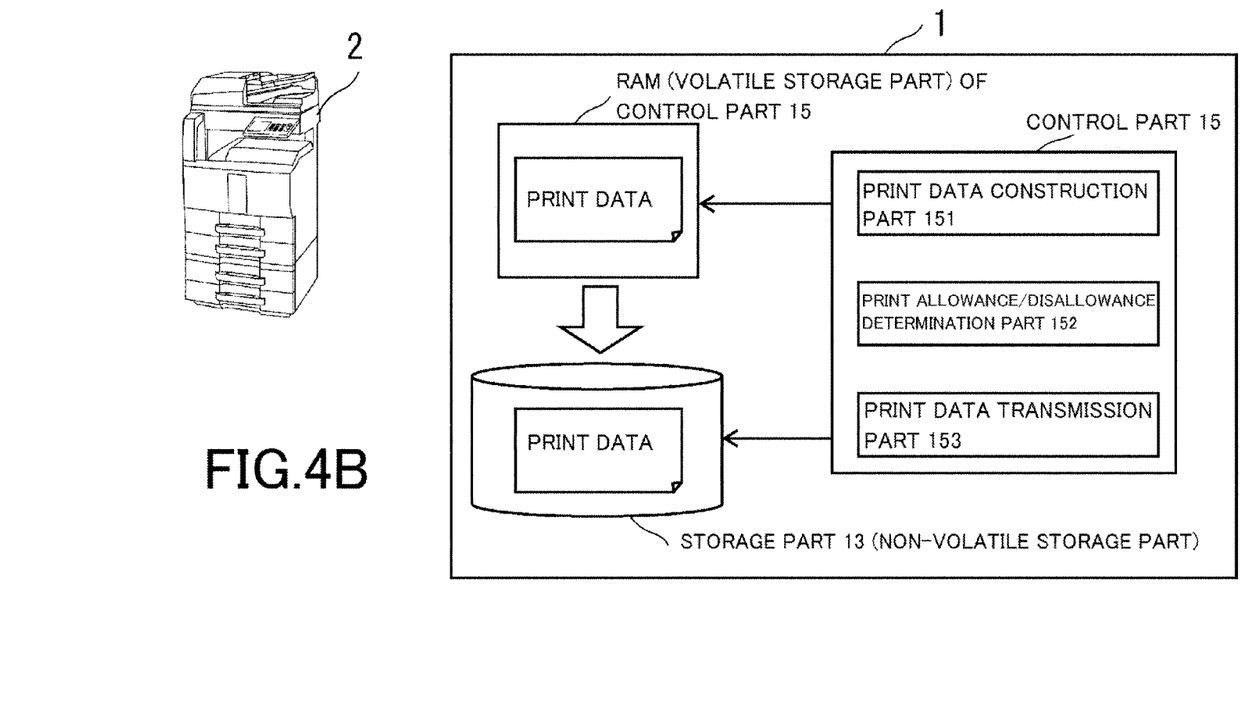
FIG. 4B is an explanation view explaining a stage of the print data transmission operation of the mobile terminal device shown in FIG. 1.

If the result of Step A4 indicates that the battery residual amount is less than the battery consumption amount, the print allowance/disallowance determination part 152 causes the storage part 13 i.e., the volatile storage part to store the print data (Step A7). Thereby, as shown in FIG. 4B, a condition is established under which the print data is stored in both the RAM of the control part 15 and the storage part 13.

Figure 4C:
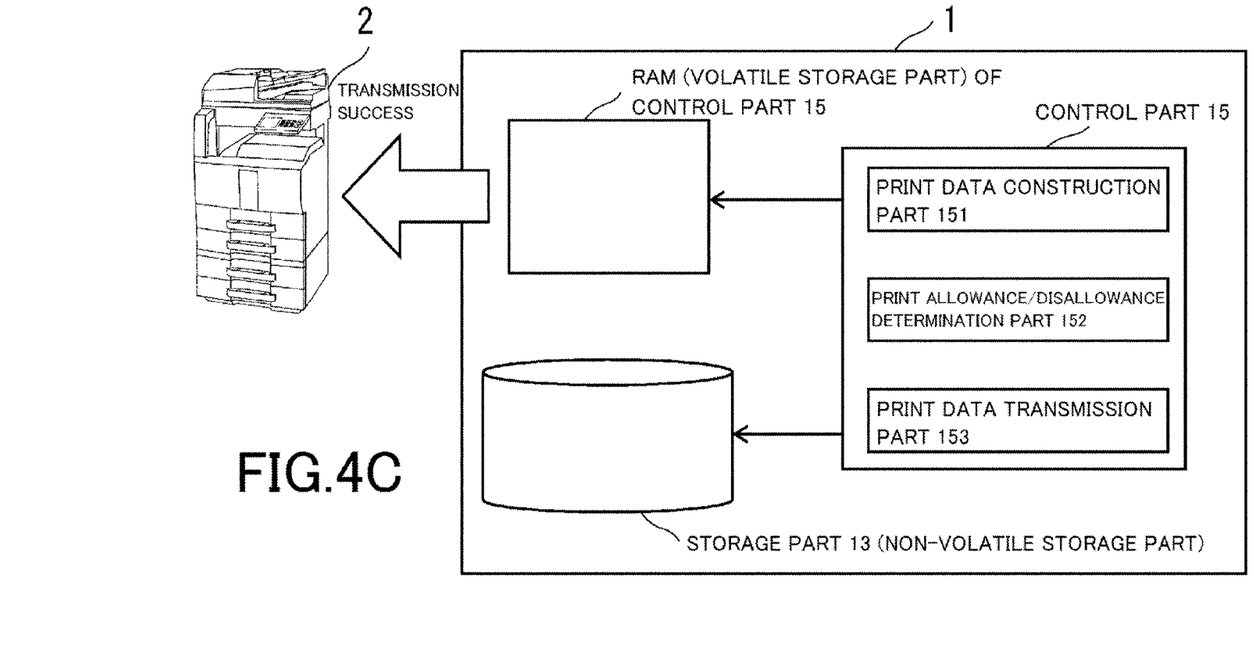
FIG. 4C is an explanation view explaining a stage of the print data transmission operation of the mobile terminal device shown in FIG. 1.

Then, the control part 15 begins to act as the print data transmission part 153 and causes the communication part 14 to transmit the print data to the image forming apparatus 2 (Step A8). Then, the print data transmission part 153 determines whether or not the transmission terminates in success (Step A9). For example, if starting charging of the mobile terminal device 1 before battery exhaustion and if the transmission terminates in success in Step A9, the control part 15 begins to act as the print data construction part 151, as shown in FIG. 4C, erases the print data stored in the storage part 13 (Step A10), and thereafter terminates the print data transmission operation.

Figure 4D:
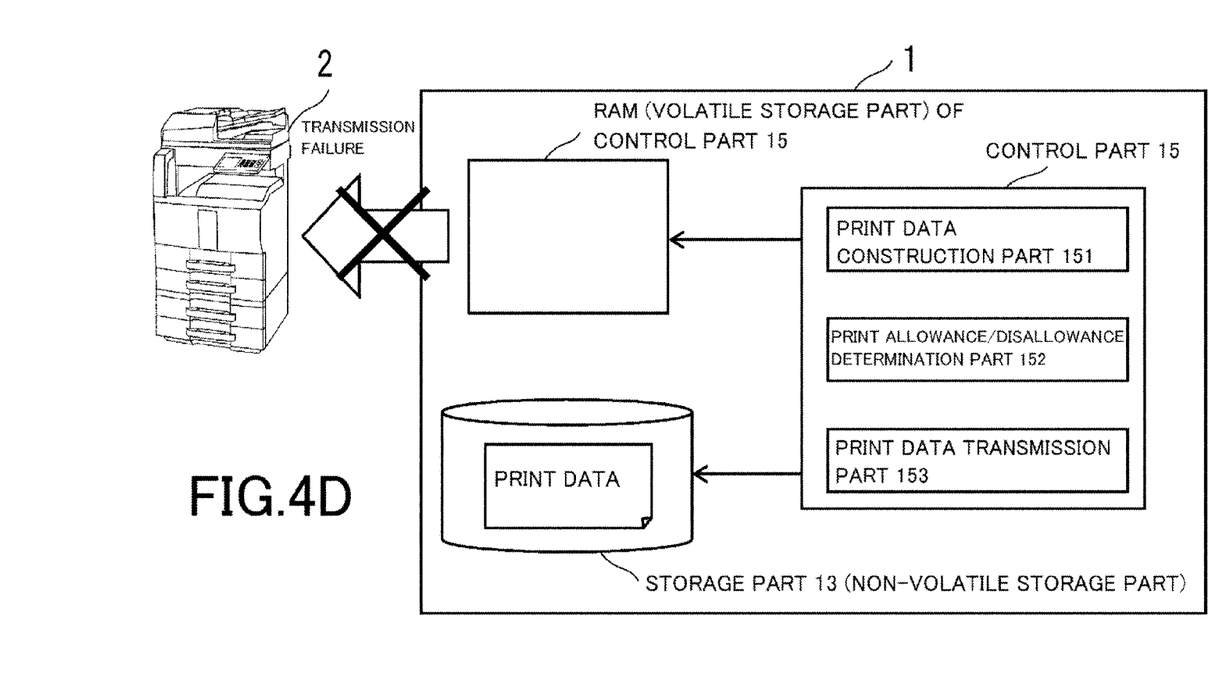
FIG. 4D is an explanation view explaining a stage of the print data transmission operation of the mobile terminal device shown in FIG. 1.

If the transmission terminates in failure in Step A9, the program returns to Step A8 for causing the print data transmission part 153 to re-try the print data transmission. If the number of the transmission failures in Steps A6 and A9 reaches a specified value, it is preferred to regard as a transmission error and therefore terminate the print data transmission operation. If the battery exhaustion occurs without succeeding in transmission of the print data, as shown in FIG. 4D, though the print data stored in the RAM of the control part 15 is erased, a condition is established under which the print data is stored in the storage part 13.

Next, with reference to FIG. 5, FIG. 6A, FIG. 6B, FIG. 6C, and FIG. 6D, a description is made in detail as to the print data re-transmission operation.

Figure 5:
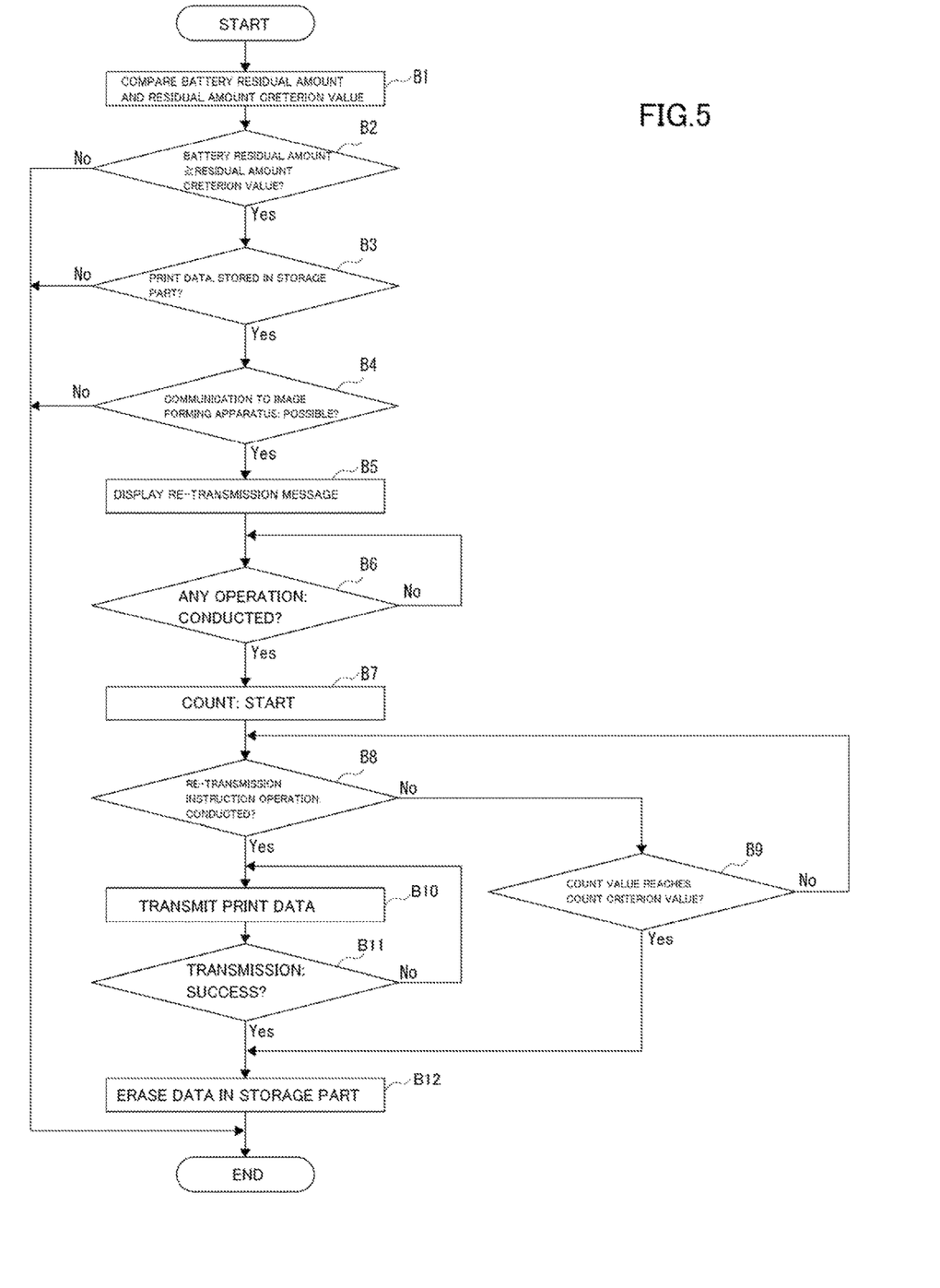
FIG. 5 is a flowchart showing a print data re-transmission operation of the mobile terminal device shown in FIG. 1.

The control part 15 makes a comparison between the battery residual amount that is detected by the battery residual part 12 and a specified residual amount criterion (Step B1) and determines whether the battery residual amount is greater than or equal to the specified residual amount criterion (Step B2). These Steps B1 and B2 are executed at a time when a power supply is turned on and at a regular interval. In Step B2, it is determined whether or not the power supply is ensured for completing the print data transmission, regardless of the data amount, without troubles. In other words, the specified residual amount criterion is set for ensuring that a print data transmission completes, regardless of the data amount, without troubles. In a case of an external power supply such as a connection of an AC power supply, it is possible to ensure the power supply for completing the print data transmission, regardless of the data amount, without troubles, which causes Step B2 to determine that the battery residual amount is greater than or equal to the specified residual amount criterion.

Figure 6A:
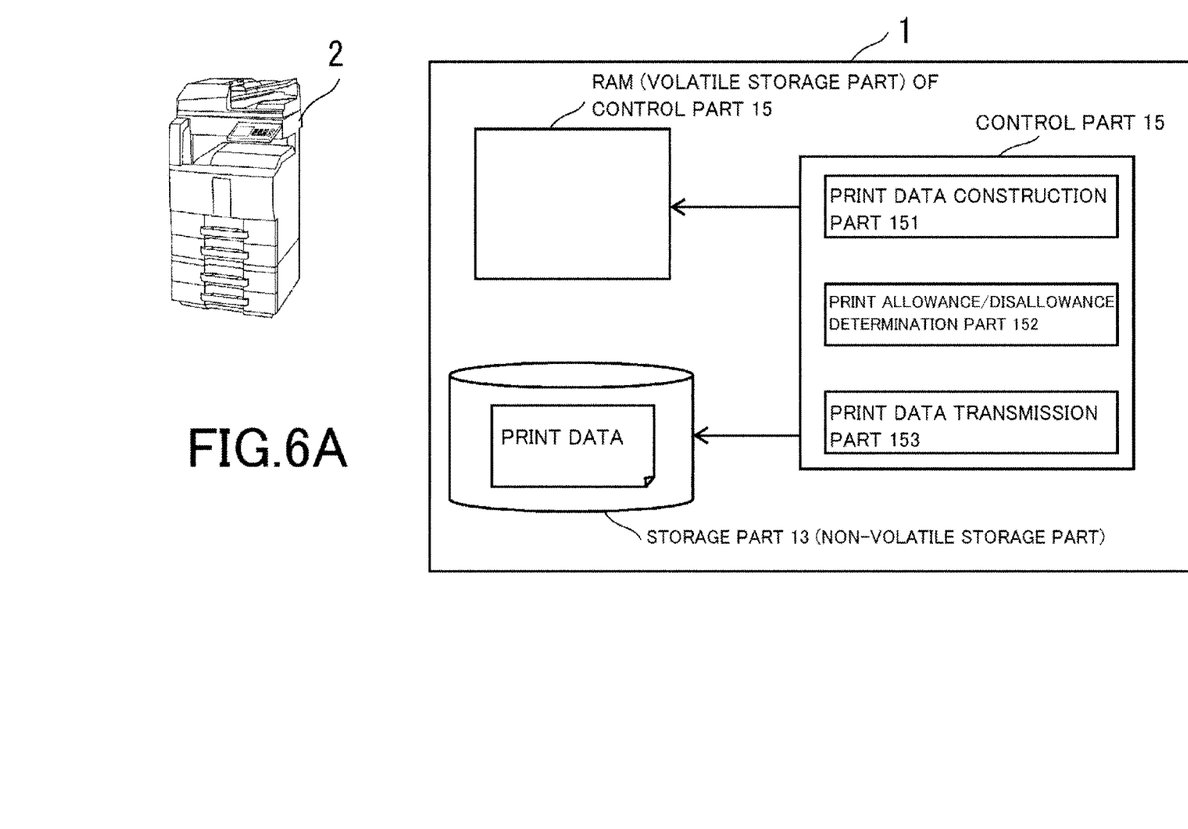
FIG. 6A is an explanation view explaining a stage of the print data re-transmission operation of the mobile terminal device shown in FIG. 1.

If the result of Step B2 indicates that the battery residual amount is greater than or equal to the specified residual amount criterion, the control part 15 determines whether or not the print data is stored in the storage part 13 (Step B3). Then, if the print data is stored in the storage part 13 as shown in FIG. 6A and if Step B3 determines that the print data is stored in the storage part 13, the control part 15 determines whether or not a communication is available to the image forming apparatus 2 (Step B4). Step B4 determines that the communication is available to the image forming apparatus 2 if the mobile terminal device 1 is accessible to the network such as an intra-company LAN that is connected to the image forming apparatus 2 or if the mobile terminal device 1 confirms that the image forming apparatus 2 exists using beacon or the like.

If Step B4 determines that the communication is available to the image forming apparatus 2, the control part 15 begins to act as the print allowance/disallowance determination part 152, notifies of causing the storage part 13 to store the print data, and causes the display operation part 11 to display a message that prompts for a re-transmission (Step B5). It is to be noted that the control part 15 terminates the print data re-transmission operation if Step B2 determines that the battery residual amount is less than the specified residual amount criterion, if Step B3 determines that the print data is not stored in the storage part 13, or if Step B4 determines that no communication is available to the image forming apparatus 2.

Then, the control 15 waits for receiving a user's operation from the display operation part 11 (Step B6). The user's operation in Step B6 may be any operation and determining whether or not a user's operation is conducted is used for determining whether or not the user confirms the message that is displayed on the display operation part 11 in Step B5.

If the user's operation is received from the display operation part 11 in Step B6, the control part 15 starts a count (Step B7), waits for receiving a re-transmission instruction operation that instructs re-transmitting the print data stored in the storage part 13 (Step B8), and waits until a counted value reaches a specified count criterion value (Step B9).

Figure 6B:
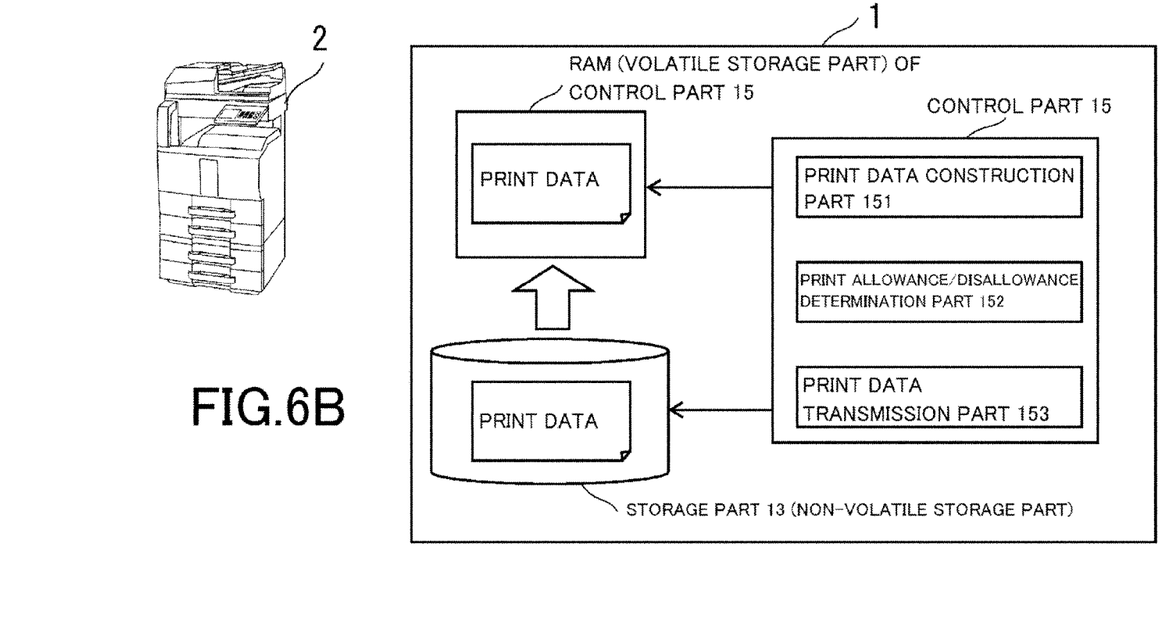
FIG. 6B is an explanation view explaining a stage of the print data re-transmission operation of the mobile terminal device shown in FIG. 1.
Figure 6C:
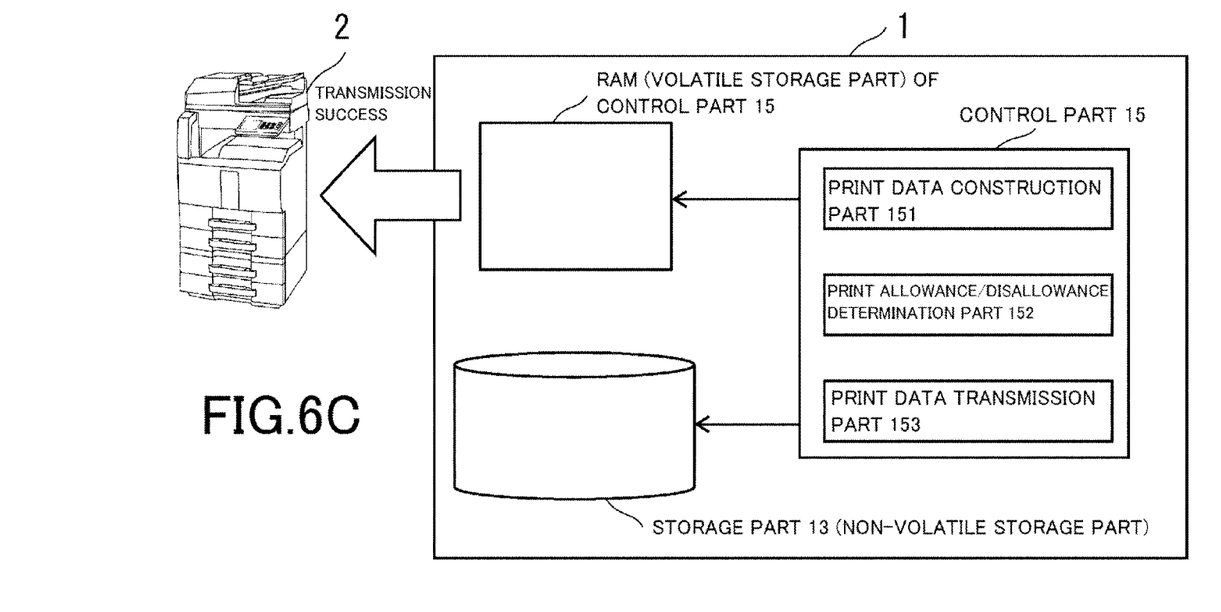
FIG. 6C is an explanation view explaining a stage of the print data re-transmission operation of the mobile terminal device shown in FIG. 1.

If the instruction for re-transmission operation is received in Step B8, the control part 15 begins to act as the print data transmission part 153, as shown FIG. 6B, and reads out the print data stored in the storage part 13 to the RAM, and causes the communication part 14 to transmit the read out print data to the image forming apparatus 2 (Step B10). It is to be noted that if Step B6 receives the re-transmission instruction operation, the program goes to Step B10 without starting the count in Step 7. Then, the print data transmission part 153 determines whether or not the transmission terminates in successful (Step B11). If the result of Step B11 indicates the success transmission, the control part 15 begins to act as the print data construction part 151 and as shown FIG. 6C, terminates the print data transmission operation after erasing the print data that is stored in the storage part 13 (Step B12).

Figure 6D:
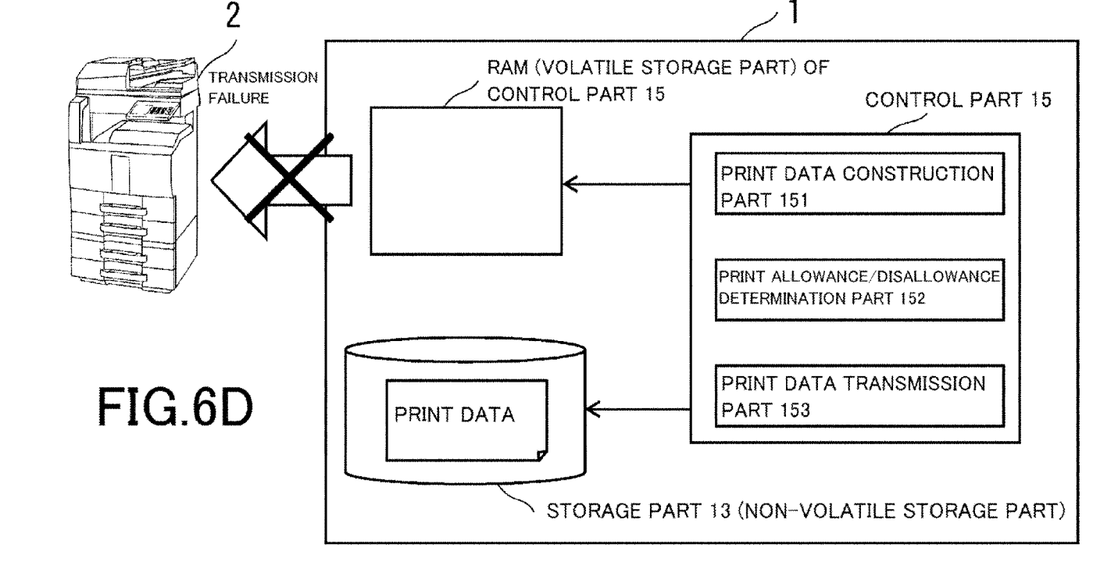
FIG. 6D is an explanation view explaining a stage of the print data re-transmission operation of the mobile terminal device shown in FIG. 1.

If the transmission terminates in failure in Step B11, the program goes back to Step B10 for causing the print data transmission part 153 to retry the print data transmission. It is to be noted that the number of the transmission failures reaches the specified criterion value, it is preferred to regard as a transmission error and therefore terminate the print data transmission operation. In such a case, as shown in FIG. 6D, a condition is established under which the print data remain stored in the storage part 13.

If the result of Step B9 indicates that the counted value reaches the specified criterion value, the control part 15 begins to acts as the print data construction part 151 and terminates the print data transmission operation after erasing the print data that is stored in the storage part 13 (Step B12). It is to be noted that the count that starts in Step B7 is preferred to be interrupted when the communication to the image forming apparatus 2 is made disabled. In such a case, the print data is prevented from being erased from the storage part 13 while the communication to the image forming apparatus 2 is being disabled i.e., while the transmission of the print data to the image forming apparatus 2 is impossible.

As described above, the present exemplary embodiment provides the mobile terminal device 1 including the battery as the power source, constructing the print data from the print target data that is stored in the RAM of the control part 15 as the volatile storage part, transmitting the print data to the image forming apparatus 2, and causing the image forming apparatus 2 to execute printing of the print data, the mobile terminal device 1 including the non-volatile storage part i.e., the storage part 13, the battery residual amount detection part 12 that is configured to detect the residual amount of the battery, the print allowance/disallowance determination part 152 that is configured to store, the print data in the storage part 13 prior to a transmission of the print data, based on the residual amount of the battery which is detected by the battery residual amount detection part 12, that no power required for the transmission of the print data is ensured.

According to this configuration, if there is a possibility of a battery exhaustion, the print data is stored in the storage part 13 i.e., the form of a non-volatile storage part, which makes it possible to prevent the print data from being erased due to the battery exhaustion.

The typical mobile terminal devices are not designed on the assumption that a battery exhaustion may occur during print data transmission. There are various forms of print data and the print data of, for example, web pages under viewing and internet payment or coupon screens which are created to print only is stored in a voltaic region. There is a problem in that the print data stored in the voltaic region is erased due to a battery exhaustion while the print data is in transmission. If the erased print data is created from the only once displayed web pages or the screens whose re-display needs cumbersome procedures, it is very cumbersome to re-construct the print data and therefore convenience of the users is made extremely impaired.

The present disclosure, which is provided in light of the aforementioned problem, has an object to provide a mobile terminal device and a method which are capable of preventing an erase of print data which is caused by a battery exhaustion.

The present disclosure, which makes it possible to store the print data in a non-volatile storage part in a case of a battery exhaustion, provides an effect of preventing an erase of the print data caused by the battery exhaustion.

Further, in the present exemplary embodiment, if the print data transmission terminates in success, the print allowance/disallowance determination part 152 erases the print data that is stored in the storage part 13.

According to this configuration, the user comes to be free from managing the print data stored in the storage part 13, thereby enhancing operability.

Further, in the present exemplary embodiment, the mobile terminal device 1 is provided with the display operation part 11, that acts as input means and transmits the print data stored in the storage part 13 to the image forming apparatus 2 in response to the receipt of the re-transmission instruction by the display operation part 11 if the battery residual amount detected by the battery residual detection part 12 is greater than or equal to the specified residual amount criterion value and if the print data is stored in the storage part 13.

According to this configuration, securing the power supply by, for example, the charging makes it possible to transmit the print data again.

Furthermore, in the present exemplary embodiment, the mobile terminal device 1 is provided with the display operation part 11 that acts as display means and causes the display operation part 11 to display the re-transmission message for prompting the re-transmission of the print data if the battery residual amount detected by the battery residual detection part 12 is greater than or equal to the specified residual amount criterion value and if the print data is stored in the storage part 13.

According to this configuration, it is possible to notify that the print data is not transmitted and is stored in the storage part 13 to the user.

Moreover, in the present exemplary embodiment, the print allowance/disallowance determination part 152, if the display operation part 11 receives any operation except for the re-transmission instruction after the display operation part 11 displays the re-transmission message and thereafter if a specified time interval elapses during which the communication to the image forming apparatus 2 is available without being received the re-transmission instruction from the display operation part 11, erases the print data stored in the storage part 13.

According to this configuration make it possible to prevent the print data from being erased from the storage part 13 at the time of the automatic erase of the unnecessary print data in the storage part 13, while transmitting the print data to the image forming apparatus 2 is being disabled.

It should be understood that the disclosure is not limited to each of the aforementioned exemplary embodiments and changes and modifications thereto will be apparent to those skilled in the art without departing from the spirit and scope of the present disclosure. In addition, the number of each the elements, and the attributes of each the of the elements which include, for example, position and shape are not limited to ones shown in the aforementioned exemplary embodiments, and therefore may be modified in a suitable manner for carrying out the present disclosure. The elements of same functions are referred to by the same reference codes in the following each figures.

What is claimed is:

1. A mobile terminal device including a battery as a power source, constructing print data from print target data that is stored in a volatile storage part, transmitting the print data to an image forming apparatus, and causing the image forming apparatus to execute printing of the print data, comprising:
   a non-volatile storage part;
   a battery residual amount detection part that is configured to detect a residual amount of the battery; and
   a print allowance/disallowance determination part that is configured to store, pursuant to a determination thereof, the print data in the non-volatile storage prior to a transmission of the print data, the determination being, based on the residual amount of the battery which is detected by the battery residual amount detection part, that no power required for the transmission of the print data is ensured, wherein the print allowance/disallowance determination part erases the print data that has been stored in the non-volatile storage part when the transmission of the print data terminates in success.

2. A mobile terminal device including a battery as a power source, constructing print data from print target data that is stored in a volatile storage part, transmitting the print data to an image forming apparatus, and causing the image forming apparatus to execute printing of the print data, comprising:
   a non-volatile storage part;
   a battery residual amount detection part that is configured to detect a residual amount of the battery;
   a print allowance/disallowance determination part that is configured to store, pursuant to a determination thereof, the print data in the non-volatile storage prior to a transmission of the print data, the determination being, based on the residual amount of the battery which is detected by the battery residual amount detection part, that no power required for the transmission of the print data is ensured; and input means, wherein if the battery residual amount detected by the battery residual amount detection part is greater than or equal to a specified residual amount criterion value and if the print data is stored in the non-volatile storage part, receiving an instruction for a re-transmission from the input means causes the print data stored in the non-volatile storage part to be transmitted to the image forming apparatus.

3. The mobile terminal device according to claim 2 further comprising display means, wherein if the battery residual amount detected by the battery residual amount detection part is greater than or equal to a specified residual amount criterion value and if the print data is stored in the non-volatile storage part, the display means is caused to display a re-transmission message for prompting a re-transmission of the print data.

4. The mobile terminal device according to claim 3, wherein the print allowance/disallowance determination part, if the display operation part receives any operation except for the re-transmission instruction after the display operation part displays the re-transmission message and thereafter if a specified time interval elapses during which the communication to the image forming apparatus is available without being received the re-transmission instruction from the display operation part, erases the print data stored in the non-volatile storage part.

5. A method of executing print data transmission operation, the method comprising the steps of:

causing a mobile terminal device that has a battery, a volatile storage part and a non-volatile storage part to construct print data from print target data that is stored in the volatile storage part;

causing the mobile terminal device to transmit the print data to an image forming apparatus; and causing the mobile terminal device to allow the image forming apparatus to print out the print data, the method further comprising the steps of:

causing the mobile terminal device to act as an allowance/disallowance determination part;

confirming that no power required for a transmission of the print data is ensured based on a residual amount of a battery which is detected by a battery residual amount detection part;

causing the non-volatile storage part to store therein the print data prior to a transmission of the print data; and causing the non-volatile storage part to delete the print data stored therein when the transmission of the print data terminates in success.

* * * * *